United States Patent [19]

Morimoto

[11] Patent Number: 4,508,321

[45] Date of Patent: Apr. 2, 1985

[54] LATTICED TUBULAR FENCE AND METHOD OF MAKING SAME

[75] Inventor: Tsuyoshi Morimoto, Osaka, Japan

[73] Assignee: Totoku Co., Ltd., Osaka, Japan

[21] Appl. No.: 463,284

[22] Filed: Feb. 2, 1983

[51] Int. Cl.³ .......................................... E04H 17/14
[52] U.S. Cl. ................................... 256/65; 403/248; 403/242; 29/523; 182/228
[58] Field of Search .................. 256/65; 403/248, 242, 403/193, 249, 255, 263; 285/248, 382.4, 222; 29/523; 182/228

[56]  References Cited
U.S. PATENT DOCUMENTS 2,614,827 10/1952 Peach et al. ................. 285/382.5 X
3,073,627  1/1963 Ritter ............................... 285/222
3,989,282 11/1976 Zimmerman .................... 403/248 X

FOREIGN PATENT DOCUMENTS 49640 4/1977 Japan ..................................... 256/65

Primary Examiner—Andrew V. Kundrat
Attorney, Agent, or Firm—Trexler, Bushnell & Wolters, Ltd.

[57]  ABSTRACT

A tubular fence is made by fixing a vertical tube on a horizontal tube. A method of making the same is disclosed wherein an opening part is formed on the side of the horizontal tube. A pin having a large diameter remote end, a smaller diameter adjacent end, and a tapering connecting part is positioned in the horizontal tube aligned with the opening part or in the end of the vertical tube. As the end part of the vertical tube is inserted into the opening part, the end part of said vertical tube is caused to be expanded outwardly by press-fitting said vertical tube to said pin from outside, whereby it is held closely adherent to said opening part.

3 Claims, 4 Drawing Figures

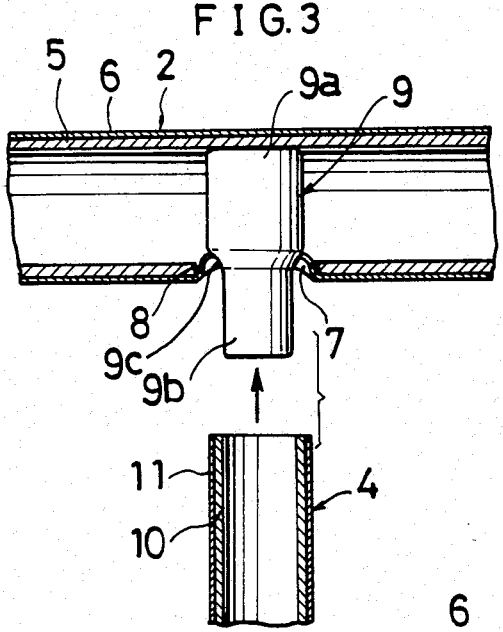
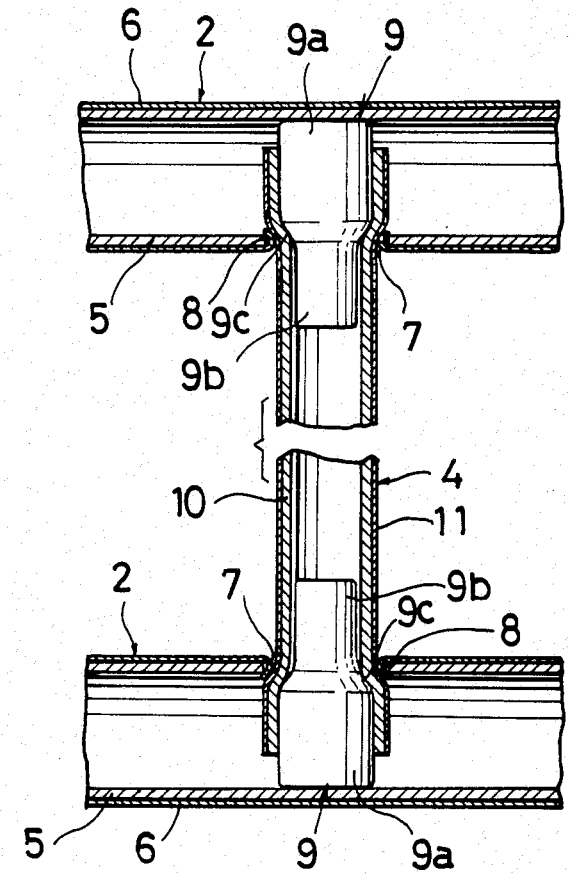

LATTICED TUBULAR FENCE AND METHOD OF MAKING SAME

BACKGROUND OF THE INVENTION

This invention relates to a latticed tubular fence and to a method of making the same, and more particularly, to a process of interconnecting the structural members of said tubular fence. The fence includes upper and lower horizontal tubes of relatively large diameter extending between upright posts, and a plurality of vertical smaller tubes arranged at regular intervals extending between said horizontal tubes, and further to the construction of the fixed parts thereof.

Generally speaking, when securing both ends of the vertical tubes on the confronting parts of the horizontal tubes, the vertical tubes were welded directly to the horizontal tubes. This requires a great deal of time and labor and is therefore expensive.

OBJECTS AND SUMMARY OF THE PRESENT INVENTION

Accordingly, it is an object of the present invention to provide a tubular fence and a method of making the same which is technically far simpler and more workable as compared with the welding in the above-mentioned processes, thereby leading to production at low cost.

Another object of this invention is to provide a tubular fence and a method of making the same in which the vertical tubes and the horizontal tubes can be secured together quickly by such a very simple process that both ends of the vertical tubes are press-fitted into the opening parts of the horizontal tubes through the medium of pins being put in the opening parts of the horizontal tubes or in the end parts of the vertical tubes.

A further object of this invention is to provide a tubular fence and a method of making the same in which the outer circumferential parts of the vertical tubes are made so as to fit snugly with the opening parts of the horizontal tubes at the time that the end parts of the vertical tubes are inserted in the opening parts of the horizontal tubes, so that there is no likelihood of rust, etc., being generated by the intrusion of water.

Still a further object of this invention is to provide a tubular fence and a method of making the same in which there occurs little deformation of the vertical tubes externally of the horizontal tubes, and no retaining members are exposed at the time of insertion of the vertical tubes in the opening parts of the horizontal tubes, whereby the fence always looks fine externally.

Yet another object of this invention is to provide a tubular fence and a method of making the same in which at least the horizontal tubes are made of clad tubes consisting of iron tubes and stainless tubes plated over the outer circumstance of said iron tubes, circumferential portions of the stainless tubes being flanged internally at the openings of the horizontal tubes to shield adjacent portions of the iron tubes against entrance of water, etc.

BRIEF DESCRIPTION OF THE DRAWINGS

These and other objects of this invention and many of the attendant advantages will be more clearly understood from the following description with reference to the accompanying drawings wherein:

FIG. 3 is a longitudinal sectional view of the principal part showing a method of fitting or securing a vertical tube to the horizontal tube; and FIG. 4 is a partially broken away longitudinal sectional view showing a vertical tube inserted into both the upper and the lower horizontal tubes and fixed or secured thereto.

DETAILED DESCRIPTION OF THE ILLUSTRATED EMBODIMENT

Figure 1:
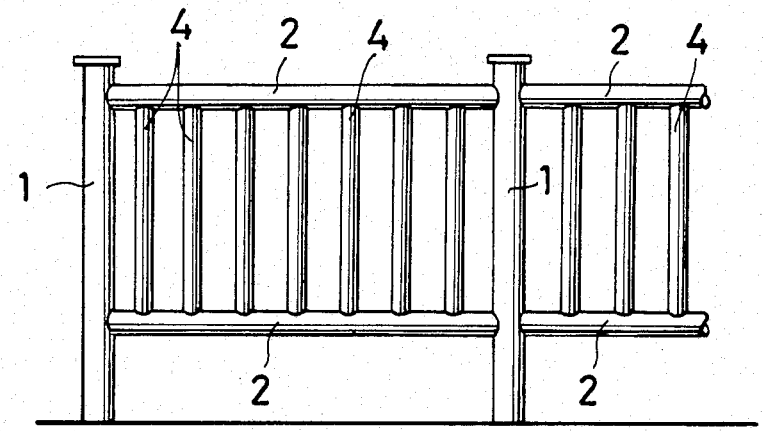
FIG. 1 is a front view showing a part of a tubular fence according to the invention.
Figure 2:
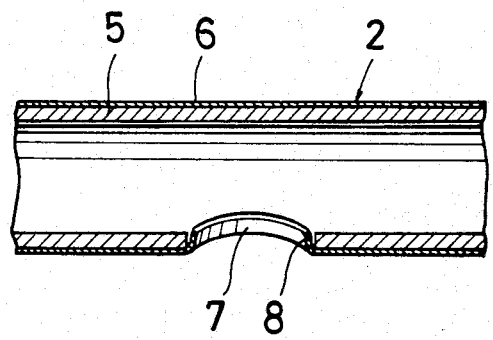
FIG. 2 is a longitudinal sectional view of a principal part of a horizontal tube.

In FIG. 1, reference numerals (1) (1) indicate posts arranged suitably at regular intervals; (2) (2) indicate both upper and lower horizontal tubes spanned from post to post, and (4) (4) indicate a plurality of vertical tubes being fixed or secured to the upper and lower horizontal tubes (2) (2) and extending therebetween. As will be seen from the above, this invention relates especially to the structure of the interconnection of the horizontal tubes and the vertical tubes. Therefore, description will be now directed to this structure in accordance with its assembling process.

For a start, as seen in FIG. 1, the horizontal tube (2), which is a "clad tube", namely, an iron tube (5) being plated over its outer surface with a thin stainless tube (6), is formed on its flank or side face whereto the vertical tube (4) is to be fitted, with an opening (7) a little larger in diameter than the vertical tube (4). The opening in this stainless tube is smaller than in the iron tube and circumferential material of the stainless tube is flanged inwardly at (8) in such a manner that it may cover the adjacent edge of the iron tube (5).

Next, as seen in FIG. 3, the reference numeral (9) indicates a pin of which remote end is larger in diameter than the inner diameter of the vertical tube (4), the other or adjacent end being smaller, and the connecting part between the large diameter part (9a) and the small diameter part (9b) being made in the form of a slightly tapered part (9c). This pin (9) is inserted with the side of its large diameter part (9a) through the opening part (7) into the horizontal tube (2).

The vertical tube (4), like the foregoing horizontal tube (2), is a "clad tube", namely, an iron tube (10) being plated over its outer circumference with a thin stainless tube (11). This vertical tube (4) is inserted with its end into the above-mentioned opening part (7) of the horizontal tube (2) over the smaller end (9b) of the pin (9) and axial pressure on the tube (4) deforms the end thereof over the large diametral part (9a) of the pin (9) with the aid of hydraulic or other means. Accordingly, the end of the vertical tube (4) is expanded outward at the time of being pressed-in along the tapered part (9c) of the pin (9), since the large diametral part (9a) of the pin (9) is larger than the inner diameter of the vertical tube (4), whereby the outer circumferential part of the vertical tube (4) is adhered closely to the opening part (7) of the horizontal tube (6), to be more exact, to the flanged part (8) of the stainless tube (6), thereby both the vertical tube and the horizontal tube being held securely.

It is not important whether the pin (9) is first installed in the horizontal tube (2) as described above, or whether the pin (9) is first put in the end part of the vertical tube (4), and this vertical tube (4) is made to ride over the large diametral part of the pin (9) simultaneously with the pressing of the vertical tube (4) into the opening part (7) of the horizontal tube (2).

Further the horizontal tube (2) and the vertical tube (4) can have a cross section other than circular, for example square in cross-section. It goes without saying that if the cross-section of the vertical tube (4) is square, then the opening part (7) of the horizontal tube (2) is correspondingly to be square. The length of one side of such square is to be construed within the term "diameter" in the ensuing claims.

The invention is claimed as follows:

1. A tubular fence comprising a horizontal tube comprising a clad tube having an inner iron tube and an outer overlying stainless layer, said horizontal tube having a lateral opening of predetermined diameter in said iron tube, a flange of said outer stainless layer extending inward through said opening and covering the edge of the opening in the iron tube, a vertical tube extending through said flange in contacting relation therewith into said horizontal tube, and an expanding pin press fitted in the end of said vertical tube and expanding the end thereof into said contacting relation with said flange.

2. The method of making a tubular fence consisting of interlocked horizontal and vertical tubes respectively of relatively large and relatively small diameters, wherein at least said horizontal tube is a clad tube including an inner iron tube and an outer overlying stainless layer, said method comprising providing an opening in the horizontal tube iron tube which is larger than the diameter of the vertical tube and providing an aligned smaller opening in the outer overlying stainless layer, flanging the material of said outer overlying stainless layer adjacent said smaller opening inwardly through the opening in the iron tube, to produce a flange covering the edge of the hole in the iron tube providing a pin having a remote diameter greater than the diameter of said vertical tube and an adjacent diameter small enough to fit within said vertical tube, inserting said pin through said flange and into said horizontal tube and inserting the adjacent diameter of said pin in said vertical tube, and forcing said vertical tube inwardly of said flange and over said pin to enlarge said vertical tube within the horizontal tube, the vertical tube being in contacting relation with said flange.

3. The method of making a tubular fence as set forth in claim 2 wherein said pin has a tapered section between said pin remote diameter and said adjacent diameter, and wherein the vertical tube is enlarged by forcing it over said pin tapered section.

* * * * *